Nov. 24, 1925.                                                                1,562,652
                              W. C. NABORS
                                TRAILER
                           Filed April 3, 1925
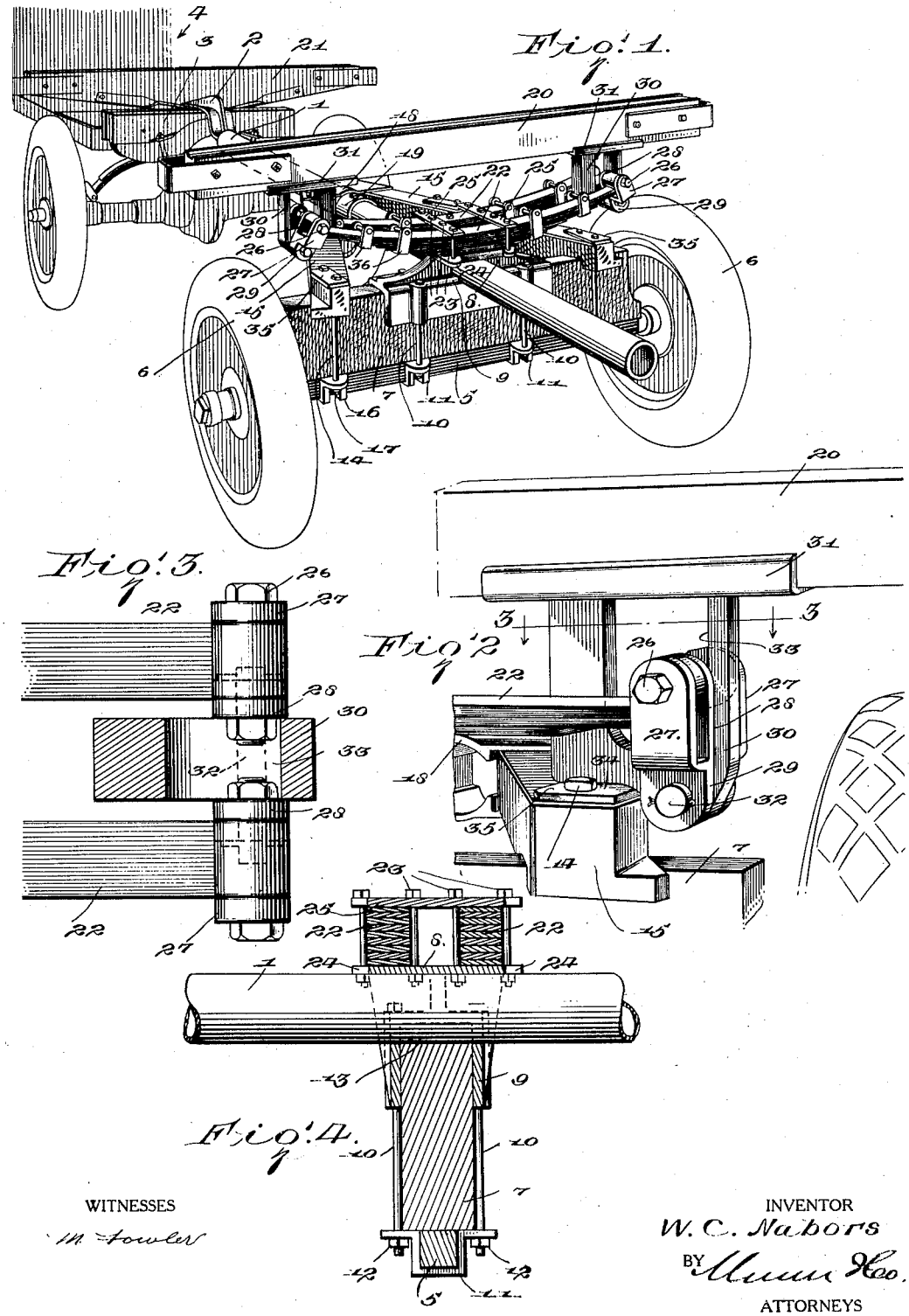
WITNESSES                                                              INVENTOR
                                                                    W. C. Nabors
                                                                    BY
                                                                       ATTORNEYS Patented Nov. 24, 1925.

1,562,652

UNITED STATES PATENT OFFICE.

WILLIAM C. NABORS, OF MANSFIELD, LOUISIANA.

TRAILER.

Application filed April 3, 1925. Serial No. 20,465.

*To all whom it may concern:*

Be it known that I, WILLIAM C. NABORS, a citizen of the United States, and resident of Mansfield, in the State of of Louisiana, have invented certain new and useful Improvements in Trailers, of which the following is a specification.

This invention relates to trailers, more particularly to a trailer that is adapted to be attached to a tractor or other draft vehicle and is adapted to cooperate with the tractor or other draft vehicle to support a load of logs, poles or other relatively long and heavy members.

An object of the invention is to provide a trailer which affords facilities for resiliently supporting a load above the axle of the trailer truck so that no fore-and-aft zigzag movement or oscillations of the trailer truck axle will be caused by the imposition of unequal and constantly changing loads or other stresses on the trailer truck above opposite end portions of the trailer truck axle.

A further object of the invention is the provision of a trailer truck having means for resiliently supporting a load above the axle and for limiting the downward movement of the load supporting means toward the axle to prevent contact of the load supporting means with the adjacent wheel when a relatively heavy load is placed on the load supporting means above an end portion of the trailer truck axle.

A still further object of the invention is the provision in a trailer truck of an improved hanger and spring assembly for supporting a bunk or like load supporting member on the trailer truck axle.

Other objects and advantages of the invention will be apparent from the following description, considered in conjunction with the accompanying drawings, in which Figure 1 is a perspective view of the improved trailer attached to a draft vehicle, Figure 2 is a fragmentary perspective view of the improved hanger and spring assembly at one side of the trailer truck.

Figure 3 is a section substantially along the line 3—3 of Figure 2, looking in the direction of the arrows.

Figure 4 is a longitudinal vertical section through the trailer truck axle assembly and through the spring which is superimposed thereon, showing in side elevation a fragmentary portion of the reach pole of the trailer.

The improved trailer comprises a reach pole 1 which is rigidly secured at its forward end, as by means of the attaching bracket 2, to a bolster 3 or like cross member of a draft vehicle 4 so that the axis of the reach pole 1 will lie in the same vertical plane as the longitudinal median line of the draft vehicle.

The trailer includes a portion which comprises an axle 5 and a pair of wheels 6 mounted on the end portions of the axle. The trailer truck axle assembly also includes a relatively heavy cross beam or sill 7 which is superimposed on the axle 5 between the wheels 6 and is firmly secured in place on the axle 5 by means which will be described hereinafter.

A bearing block 8 which may be a metal casting has a base portion 9 which embraces the upper edge portion of the sill 7 midway between the wheels 6. The base portion 9 of the bearing block is shown as being of substantially inverted U-shape and the side flanges thereof extend downwardly along the front and rear faces of the sill 7 for a considerable distance from the upper side of the sill. The bearing block 8 is held firmly in place on the sill and the latter is secured on the axle 5 by means of bolts 10 which extend through vertical openings in enlarged portions of the base of the bearing block at the front and the rear of the sill, corresponding bolts 10 at the front and rear sides of the sill having the lower end portions thereof extended through vertical openings in the ends of a strap 11 which extends across the lower side of the axle and against the lower faces of front and rear side edge portions of the sill 7 as best seen in Figure 4, nuts 12 being screwed on the lower end portions of the bolts 10 tightly against the end portions of the sill.

The bearing block 8 is formed with a horizontal opening 13 through which the reach pole 1 extends slidably. The opening 13 is located midway between the planes of the respective wheels 6. The opening 13 is substantially circular in cross section and the portion of the reach pole 1 that extends therethrough also is circular in cross sectional contour so that the axle assembly of the trailer truck is capable of limited swinging movement about the axis of the reach pole without any torque being imparted to the reach pole.

The sill 7 is further held against displacement from the axle 5 by means of bolts 14 which extend vertically through openings in each of a pair of forwardly convergent frame members 15 at the front and rear sides of the sill 7 and through openings in the end portions of a strap 16, nuts as at 17 being screwed on the lower end portions of the bolts 14 to secure the rearward end portions of the frame members 15 in place on the sill 7 at opposite sides of the bearing block 8 and thus aiding the securing of the sill 7 in place on the axle 5. The forward end portions of the convergent frame member 15 are connected with a sleeve 18 which is axially aligned with the opening 13. The reach pole 1 extends through the sleeve 18. A stop collar 19 is secured on the reach pole for engagement with the rearward end of the sleeve 18 to prevent rearward movement of the trailer truck on the reach pole from the position shown in Figure 1 without interfering with the turning of the trailer truck within limits about the axis of the reach pole.

The trailer is provided with an elongated cross work supporting member or bunk 20 for cooperating with a similar cross work supporting member 21 on the draft vehicle to support logs or like enlongated members of a load. The work supporting member 20 that is embodied in the invention can move vertically in response to the actuation of shocks or jars without causing failure of the wheels of the trailer truck to track accurately with the wheels of the draft vehicle or in other words without causing the trailer truck to move in a zig-zag line along the roadway. This advantage over trailer trucks of ordinary construction of which I am aware is gained because of the provision of the novel spring hanger assembly that the invention contemplates for supporting the work supporting member 20 on the axle assembly. This spring hanger assembly comprises a pair of semi-elliptic leaf spring units which are arranged in juxtaposed relation to each other with the middle portions thereof resting on the upper side of the bearing block 8 above the opening 13. The middle portions of these leaf spring units are secured firmly to the bearing block and are held in parallel relation by means of bolts and nuts 23 which connect horizontal lugs or ears 24 on the bearing block with clamping plates 25 which extend across the upper faces of the middle portions of the leaf spring units. Certain of the bolts of the bolt and nut devices 23 extend between the middle portions of the two leaf spring units, other of such bolts are located in front of the front leaf spring unit while still other of such bolts connect with the bearing block at the rear side of the rear leaf spring unit. With the construction just described, the middle portions of the leaf spring units are substantially rigid with the bearing block on the axle assembly and the end portions of the leaf spring units extend outwardly and upwardly from the bearing block above the end portions of the sill 7.

The opposite end portions of each leaf spring unit are attached to parallel pivot elements 26, each of which is supported in aligned openings in the upper end portions of branches 27 and 28 respectively of a rigid link 29. A hanger plate 30 has an attaching portion 31 at its upper end rigidly secured to an end portion of the work supporting member 20 so that the hanger plate depends vertically edgewise between the link 29 at adjacent ends of the two leaf spring units, there being a hanger plate 30 for each pair of leaf spring links 29. A pivot element 32 connects the lower end portions of the links 29 to the lower end portion of the hanger plate 30 that depends therebetween so that the pivot elements 26 at the upper ends of the adjacent links 29 will be in alignment with each other. The hanger plate 30 may be provided with a vertical aperture 33 in which the adjacent ends of the pivot elements 26 may move as the ends 29 swing about the axis of the pivot elements 32 by means of which they are attached to the hanger plate. Each hanger plate 30 is formed with a substantially horizontal lower face, as at 34, adapted to move downwardly into contact with a flat plate 35 on the adjacent frame member 15 when a relatively heavy load has been imposed on the work supporting member 20 or the latter has been subjected to severe shocks tending to move it downward, the effect of the contact of the face 34 of the hanger plate 30 with the stop plate 35 being to prevent further downward movement of the supporting member 20 so that the latter will not contact with the wheels of the trailer. The leaves of each leaf spring unit may be bound together at intervals along their length by clips 36 or like devices.

From the foregoing, it will be manifest that movement of the work supporting member 20 vertically will be cushioned by the springs 22 and that the opposite end portions of the work supporting member 20 can move relatively to the axle assembly different distances in a vertical plane without interfering with the tracking of the wheels of the trailer with the wheels of the draft vehicle and without tending to cause the trailer truck to move in a zig-zag manner. As pointed out in the foregoing, the hanger plates 30 serve also as bumpers for engaging with the stop or striker plates on the axle assembly to prevent the load supporting member or the load carried thereby from striking the wheels.

I claim:—

1. In a trailer, an axle supported on wheels, a sill superposed on said axle, a bearing block secured on the sill intermediate the length of the latter and midway between the wheels, said bearing block having an opening for the reception of a reach pole, a semi-elliptic spring secured intermediate its length on said bearing block with the concavely curved side thereof uppermost, an elongated cross member adapted to support a load, hanger plates depending from said cross member adjacent to opposite ends of said spring, and links attached at their lower ends to the lower end portions of said hanger plates and pivotally attached at their upper ends to the ends of said springs.

2. In a trailer, a rigid axle assembly, a semi-elliptic spring secured intermediate its length on the axle assembly intermediate the length of the latter, the concavely curved side of the spring being upward, a cross member adapted to support a load, a pair of combined hanger and bumper plates depending from said cross member adjacent to the opposite ends of said spring, links connecting said combined hanger and bumper plates with the ends of said spring, and stop plates on said axle assembly in the path of downward movement of said bumper plates for limiting the downward movement of said cross load supporting member toward said axle assembly.

3. In a trailer, an axle supported on wheels, a sill supported on the axle and rigid therewith, a bearing block secured on said sill midway between said wheels, said bearing block having an opening extending from the front to the rear side thereof, a reach pole slidably and rotatably received in said opening of the bearing block, a collar loosely mounted on the reach pole in advance of said bearing block, rigid forwardly converging members connecting said collar with opposite end portions of said sill, a stop collar carried by said reach pole rearwardly of said first named collar, and spring means secured on said bearing block above said reach pole for supporting a member on which a load may be disposed, said spring means acting in a plane which intersects the reach pole at right angles to the direction of length of the reach pole.

4. In a trailer, a rigid axle assembly, a pair of parallel semi-elliptic leaf spring units each secured intermediate its length on the axle assembly midway of the length of the latter, an elongated cross member for supporting a load, a pair of hanger plates depending from said cross member adjacent to opposite ends of the spring units and between adjacent end portions of the respective spring units, and a pair of links respectively disposed at opposite sides of each hanger plate, pivot elements connecting the lower ends of the pairs of links to the lower end portions of the associated hanger plates, and other pivot elements connecting adjacent ends of the two spring units to the upper end portions of said pairs of links, each hanger plate having an aperture formed therein into which the adjacent ends of the pivot elements for the upper ends of the associated links extend.

5. In a trailer, a rigid axle assembly, a pair of parallel semi-elliptic leaf spring units each secured intermediate its length on the axle assembly midway of the length of the latter, an elongated cross member for supporting a load, a pair of hanger plates depending from said cross member adjacent to opposite ends of the spring units and between adjacent end portions of the respective spring units, and a pair of rigid links for each hanger plate, the respective links being pivotally attached to the lower end portion of the hanger plate at opposite sides of the latter, the upper end portion of each link having forks between which an end of the spring unit is pivotally secured, said hanger plate being formed with an aperture and the pivot elements at the upper ends of the links adjacent to said hanger plate extending into said aperture.

WILLIAM C. NABORS.